(No Model.)
H. O. TRIPLETT.
GRAIN SEPARATOR.
No. 410,776. Patented Sept. 10, 1889.
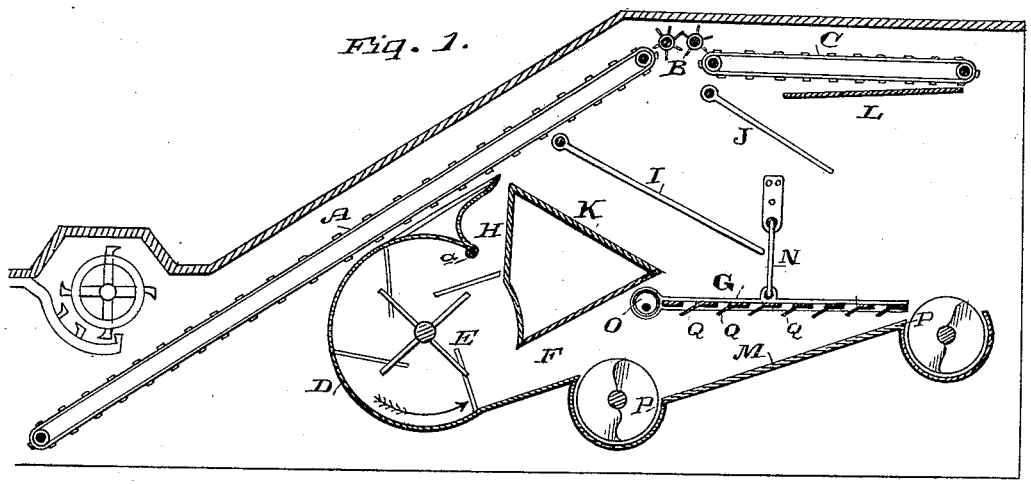
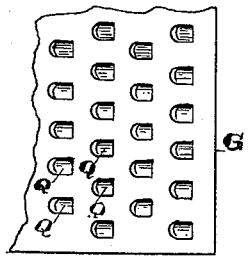
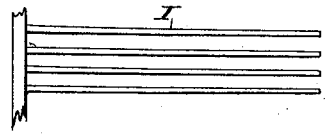
Witnesses,
Geo. H. Strong.
J. H. Krouse.
Inventor,
Hezekiah O. Triplett,
By Dewey & Co.
Attys

UNITED STATES PATENT OFFICE.

HEZEKIAH O. TRIPLETT, OF ORLAND, CALIFORNIA.

GRAIN-SEPARATOR.

SPECIFICATION forming part of Letters Patent No. 410,776, dated September 10, 1889.

Application filed May 15, 1889. Serial No. 310,896. (No model.)

*To all whom it may concern:*

Be it known that I, HEZEKIAH O. TRIPLETT, of Orland, in the county of Colusa, State of California, have invented an Improvement in Grain-Separators; and I hereby declare the following to be a full, clear, and exact description of the same.

My invention relates to certain improvements in apparatus for separating grain from the straw and chaff with which it is mixed when it leaves the thrashing-cylinder.

It consists in certain details of construction, which will be more fully described by reference to the accompanying drawings, in which—

Figure 1 is a longitudinal vertical section of the rear portion of the thrashing-machine, showing my invention. Figs. 2 and 3 are details of construction.
My invention is applicable to the ordinary thrashing-machine, in which the grain and straw are deposited upon a carrying-belt A when they leave the thrashing-cylinder, and are delivered from the upper end of this carrying-belt, and the straw passing over pickers, as shown at B, and thus being carried backward and discharged from the rear of the machine by means of the straw-carrier C.

D is the fan-casing, within which the fan E revolves. In my invention I have shown this fan-casing formed with two discharge-openings, one at F, so that the greater portion of the air is delivered through the screen G, for the purpose of separating the grain from the chaff and light material. The other passage at H, which is much smaller than the passage F, delivers a small portion of the air from the fan, so that it passes through the fingers or rakes shown at I and J. The fingers I extend at an angle below the upper or discharge end of the carrier A, and are intended to receive the chaff and similar light straw which is not carried over the main straw-carrier C, and to deliver this chaff as near the rear end of the screen G as possible, while the grain falling through these fingers upon the incline K is brought nearer the front end of the screen G. The blast passing through the passage H lifts and stirs up the chaff and light straw which has fallen upon the fingers I and allows the grain to be separated and fall upon the board K, and at the same time throws the chaff up, so that it is delivered very far backward upon the screen G, while the grain is delivered nearer the front end of the screen, thus clearing the grain to a great extent of this chaff, instead of depositing the whole of it upon the front of the screen. The action of the blast also carries some of the grain farther backward, so that it is better distributed, and the front end of the shoe is not so heavily loaded with grain and chaff as in the ordinary operation of cleaning, and this enables me to use a lighter blast through the screen than would otherwise be the case. It is ordinarily necessary, on account of the tendency to clog, caused by delivering so much material upon the front end of the screen, to use a powerful blast at this point, and this is apt to blow a good deal of grain from the rear end and cause it to be lost. By reason of this double blast I am enabled to separate and distribute the material which is flowing from the grain-carrier, so that this objection is overcome. By employing a single fan with the double discharge-passages I produce an action which is equally efficient with a double fan, with very much less power than would be necessary for two.

L is the return screen-board which lies beneath the straw-carrier C, and some of the chaff and finer straw will also fall through this straw-carrier and will be brought back upon the return-board L. I have shown the series of fingers J arranged beneath the discharge end of this board L and behind the fingers I, so that the same blast of air which is discharged from the passage H and through the fingers I will also act upon the chaff or straw which may fall upon the fingers J.

In my invention I have separated the screen G from the shoe proper and operate it independently, thus relieving the machinery of the additional weight of the shoe and the incline grain-board M, which is usually carried in the shoe and must be moved by the machinery which oscillates the screen.

My screen is suspended by hanging rods N upon each side and at points just behind the center of the screen. The front end of the screen is actuated by a crank or eccentric, as shown at O, which gives it a rotary motion, while, by reason of the approximately central suspension upon the rods N, the rear portion of the screen has a similar rotary motion with the front end, while the central portion has a forward and backward oscillating motion. This produces a double and opposite rotary movement of the front and rear portions of the screen, and this movement is similar to that which is adopted by miners in the use of the pan for washing gold, and is very effective in separating the grain.

The inclined grain-board M is fixed in place, and not being moved with the screen the weight upon the latter is greatly reduced, and at the same time, the board M being attached at its upper and lower ends at the auger-casings P, it will be seen that a tight joint will be maintained at these points and grain will not be lost over, as in case where the grain-board moves with the screen.

The screen G is made of zinc or other suitable metal having curved or horseshoe-shaped slots punched in its surface, and the tongues or flexible portions Q, which are thus formed by cutting these slots, are bent downward, so that they incline toward the front, and will thus act as guides to the blast of wind which passes out through the lower and larger passages F from the fan, so that this air will pass easily through the screen and will be directed by it without the aid of other direction-boards, while at the same time the heavier grain will fall through these slots upon the grain-board M. The upper side of the passage H is hinged at $a$, and may be turned about the hinge, so as to regulate the size of the discharge-opening.

These improvements are easily applied to any separator or thrashing-machine of the ordinary construction with a little additional change.

Having thus described my invention, what I claim as new, and desire to secure by Letters Patent, is—

1. A single fan-case and fan having the discharge-passages F and H, in combination with the carriers A and C, the fingers I and J, arranged with relation to each other, as shown, to receive an air-blast from the passage H, the inclined board K, and the oscillating screen G, substantially as herein described.

2. The improvement in separators for thrashing-machines, consisting in the combination, with the carriers A and C and the return-board L, of the double series of fingers I and J, arranged with relation to each other and the carriers, as shown, an oscillating screen G, and the inclined board K, together with fan, and the fan-case having the blast-openings F and H discharging independently through the screen and the fingers, as herein described.

3. The single independent screen having its central portion suspended upon links N, and an eccentric or crank O, connected with one end of the screen, substantially as herein described.

4. The stationary inclined grain-board M, arranged beneath the screen and extending between the auger-cases P and P', as shown, the independent screen G, having its central portion suspended by links or hangers and the end connected with an eccentric, whereby a rotary motion is imparted to the opposite ends of the screen and a horizontal swinging motion to the central portion, substantially as herein described.

5. A grain-cleaning device consisting of a centrally-suspended screen, a crank connected with one end, a screen-bottom with segmental downwardly-bent tongues cut in its surface, and a fixed inclined grain-board beneath, an inclined chute discharging upon the screen, a fan and a fan-casing with blast-openings above and below the chute, and superposed straw-separating fingers fixed above and behind the upper blast-opening, so that both receive the single blast, substantially as herein described.

In witness whereof I have hereunto set my hand.

HEZEKIAH O. TRIPLETT.

Witnesses:
   S. H. NOURSE,
   H. C. LEE.